(12) United States Patent
Schreiber et al.

(10) Patent No.: US 9,278,385 B2
(45) Date of Patent: Mar. 8, 2016

(54) METHOD FOR THE MANUFACTURE OF A WORKPIECE WITH DEFINED SURFACE

(75) Inventors: Karl Schreiber, Am Mellensee (DE); Werner Beck, Weyhe (DE)

(73) Assignees: Rolls-Royce Deutschland Ltd & Co KG (DE); FormTech GmbH (DE)

( * ) Notice: Subject to any disclaimer, the term of this patent is extended or adjusted under 35 U.S.C. 154(b) by 1145 days.

(21) Appl. No.: 13/187,024

(22) Filed: Jul. 20, 2011

(65) Prior Publication Data

US 2012/0017663 A1    Jan. 26, 2012

(30) Foreign Application Priority Data

Jul. 23, 2010   (DE) .......................... 10 2010 032 098

(51) Int. Cl.
| | |
|---|---|
| *B21D 22/02* | (2006.01) |
| *B21D 31/00* | (2006.01) |
| *B21D 37/20* | (2006.01) |
| *F01D 5/14* | (2006.01) |
| *B21F 27/12* | (2006.01) |
| *F04D 29/02* | (2006.01) |
| *F04D 29/32* | (2006.01) |
| *F04D 29/54* | (2006.01) |

(52) U.S. Cl.
CPC ............... *B21D 22/02* (2013.01); *B21D 31/00* (2013.01); *B21D 37/20* (2013.01); *B21F 27/12* (2013.01); *F01D 5/147* (2013.01); *F04D 29/023* (2013.01); *F04D 29/324* (2013.01); *F04D 29/542* (2013.01); *F05D 2230/00* (2013.01); *Y02T 50/672* (2013.01)

(58) Field of Classification Search
CPC ...... B21D 13/02; B21D 22/022; B21D 47/00; B21D 22/02; B21D 37/20; B21D 31/00; F01D 5/147; F04D 29/023; F04D 29/324; F04D 29/542; Y02T 50/672; B21F 27/12; F05D 2230/00
USPC .................................. 72/379.2, 308, 363, 475
See application file for complete search history.

(56) References Cited

U.S. PATENT DOCUMENTS

| | | | | |
|---|---|---|---|---|
| 2,528,540 | A * | 11/1950 | Oldofredi | ........................ 101/32 |
| 3,196,660 | A * | 7/1965 | Olson | ............................. 72/376 |
| 3,435,654 | A * | 4/1969 | Papst | ............................. 72/340 |
| 4,003,306 | A | 1/1977 | Garrick et al. | |

(Continued)

FOREIGN PATENT DOCUMENTS

| | | |
|---|---|---|
| DE | 3705100 | 9/1988 |
| DE | 102004017343 | 11/2005 |

(Continued)

OTHER PUBLICATIONS

European Search Report dated Nov. 4, 2011 from counterpart foreign application.

(Continued)

*Primary Examiner* — Alexander P Taousakis
*Assistant Examiner* — Mohammad I Yusuf
(74) *Attorney, Agent, or Firm* — Timothy J. Klima; Shuttleworth & Ingersoll, PLC

(57) ABSTRACT

A method for manufacturing a workpiece 1, 2 uses a forming tool 4, 5 having a cavity 3. An embossing element 6 profiled on at least one surface is arranged on at least one surface of the forming tool 4, 5 for producing a surface structure, and with the profile of the embossing tool 6 is imparted to the surface of the workpiece 1, 2 during a forming process.

13 Claims, 2 Drawing Sheets

(56) References Cited

U.S. PATENT DOCUMENTS

Figure 1:
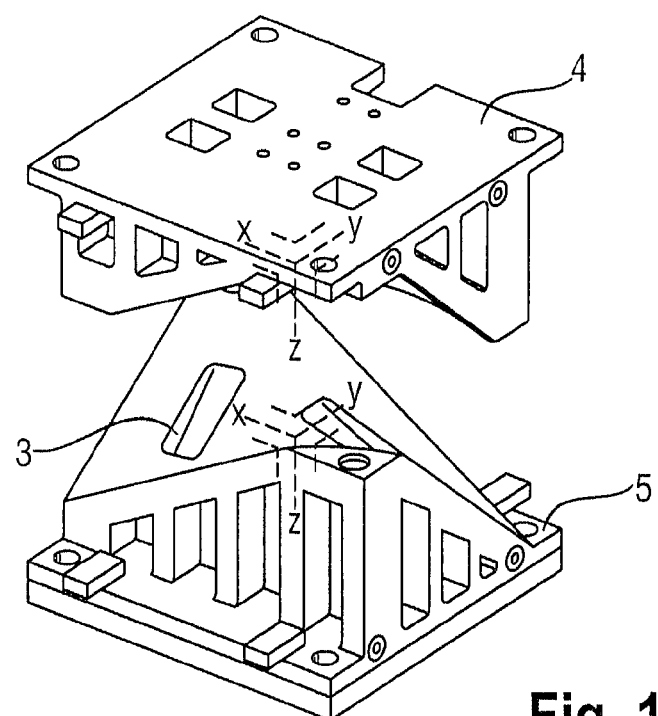

| | | | |
|---|---|---|---|
| 4,740,258 A * | 4/1988 | Breitscheidel | ................ 156/209 |
| 2003/0131646 A1 | 7/2003 | Herzog et al. | |
| 2008/0028819 A1 | 2/2008 | Hauger et al. | |

FOREIGN PATENT DOCUMENTS

| | | |
|---|---|---|
| DE | 102004019187 | 11/2005 |
| GB | 505358 | 5/1939 |
| GB | 2070486 | 9/1981 |
| JP | 2004 025273 | 1/2004 |
| WO | 01/58615 | 8/2001 |
| WO | 2007/115949 | 10/2007 |

OTHER PUBLICATIONS

German Search Report dated Dec. 28, 2010 from counterpart foreign application.

\* cited by examiner

METHOD FOR THE MANUFACTURE OF A WORKPIECE WITH DEFINED SURFACE

This application claims priority to German Patent Application DE102010032098.6 filed Jul. 23, 2010, the entirety of which is incorporated by reference herein.

This invention relates to a method for the manufacture of a workpiece with a forming tool. More particularly, the present invention relates to the development of a method for generating a defined surface on the workpiece.

A workpiece producible according to the present invention can be, for example, a hybrid component, in particular a fan or a stator vane for a gas-turbine engine. The component includes, for example, a fibre-composite material of a supporting structure onto whose surface a metal structure is partly or completely applied.

In particular, the fan blades of a fan gas-turbine engine are subject to considerable loading by centrifugal forces, gas pressure and vibrations. For this reason, a metal structure is applied, for example by adhesive bonding, onto the surface of the supporting structure. The adhesive joint must be such that even a metal structure of titanium material can be safely adhesively bonded.

The joining surface of the metal structure requires a special surface structure to provide sufficiently safe anchorage of the adhesively bonded joint.

The present invention, in a broad aspect, provides a method of the type specified above which, while being simple and easily and cost-effectively implementable, allows the generation of a defined surface structure on the workpiece.

According to the present invention, the workpiece is formed by a forming tool. Usually, the forming tool features a cavity in which the workpiece is formed. According to the present invention, an embossing element profiled on at least one surface is arranged on at least one surface of the forming tool and the profile of the embossing tool is applied or imparted to the surface of the workpiece during the forming process.

According to the present invention, the surface of the forming tool can be provided in any form, for example ground or polished, as known from the state of the art. In order to provide the workpiece with a surface structure, the embossing element is inserted between the workpiece (blank, not or only partly formed) and the forming tool. The profiled surface structure of the embossing element is imparted to the workpiece by the forces applied during the forming process.

According to the present invention, it is particularly favorable if the embossing element is provided in the form of an elastic, foil-type or lattice-type plate. Here, it is particularly advantageous if the embossing element is provided in the form of a wire mesh.

The possibility created by the present invention of interposing a separate embossing element enables the latter to be made in suitable strength and suitable material. The embossing element can, for example, be made of a high temperature resistant nickel base material. Such high temperature resistant nickel-base materials are commercially available under the designation HAYNES 242 or 244, for example. During hot forming of titanium materials, it is therefore not required according to the present invention to apply elaborate surface structures to the forming tool. This enables the forming tool to be more simply designed. Furthermore, it is not necessary that the forming tool be permanently inspected for wear and/or reworked at short intervals. Rather, the embossing element according to the present invention, which is either firmly connected to the forming tool or loosely insertable into the latter, will be replaced if required. Accordingly, only the embossing element is subject to wear, not the forming tool.

With elevated forming temperatures being applied in particular to titanium materials, for example 600° C. to 800° C., it is advantageous to make the embossing element of high-temperature resistant material. Material selection can here be made specifically in conformance with the surface structure to be provided. Here, it is advantageous according to the present invention that the embossing element can be simply designed and structured and that a corresponding surface structuring or profiling of the forming tool is not necessary for producing the surface structure of the workpiece. With regard to the manufacturing costs and the material requirements applicable to such forming tools, manufacture of forming tools of high-temperature resistant nickel-base material with directly applied fine structure is inappropriate as the latter is subject to wear, very expensive and poorly machineable.

The method according to the present invention is suitable for manufacturing a wide range of hybrid components where a supporting structure is connected to a metallic component. Application is not limited to the fan blades described, but also includes other elements of gas-turbine engines and, in general, for example force-introducing elements or similar equipment of any type of machinery or devices.

For an embossing element provided in the form of a wire mesh, it is particularly advantageous if the wire thickness ranges from 0.1 to 1.0 mm. The mesh width can preferably be 0.1 to 3 mm. With such a lattice structure, it is advantageous that the lattice easily adapts to the geometry of the workpiece or the forming tool, respectively, enabling flat parts to be inserted as the embossing element.

The present invention is more fully described in light of the accompanying drawings showing a preferred embodiment. In the drawings, FIG. 1 is a schematic representation of a forming tool to be used in accordance with the present invention, FIG. 2 is an enlarged representation of an embossing element provided as a wire lattice, and FIG. 3 shows a sectional view of a fan blade produced in accordance with the inventive method.

Figure 2:
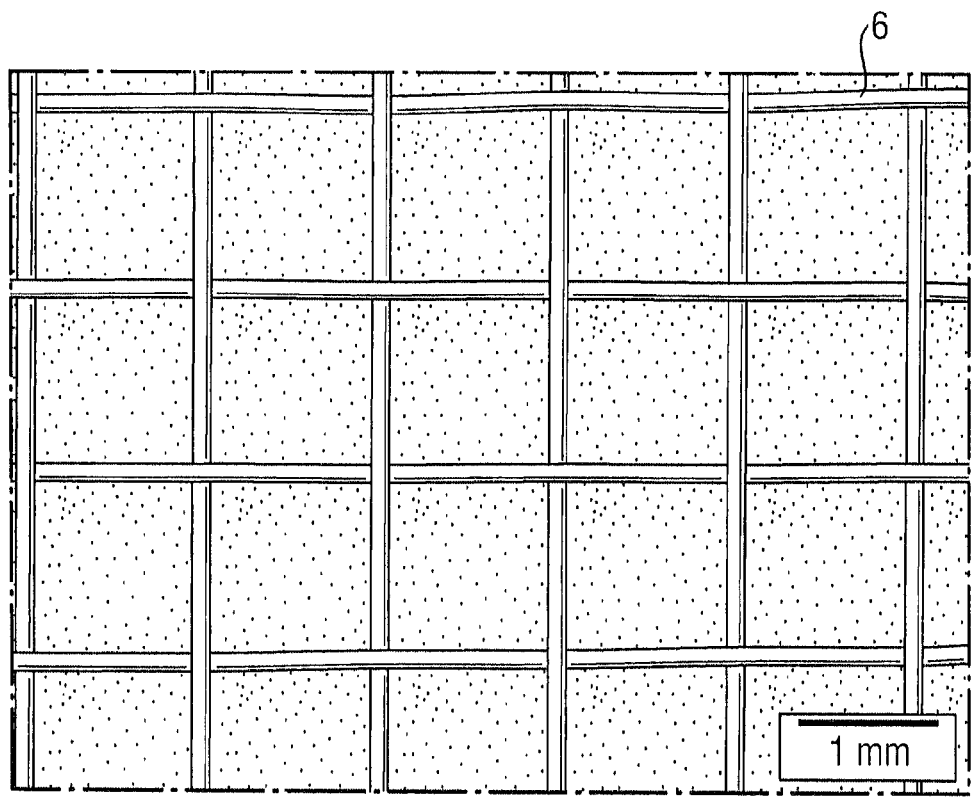

FIG. 1 shows a top tool 4 and a bottom tool 5 of a forming tool, with at least one cavity 3 being provided into which a non-illustrated blank of a workpiece 1, 2 (see FIG. 3) can be inserted. Between the workpiece 1, 2 and the surface of the forming tool 4, 5 an embossing element 6 is inserted according to the present invention which is provided, for example, as a wire lattice, as shown in FIG. 2.

Figure 3:
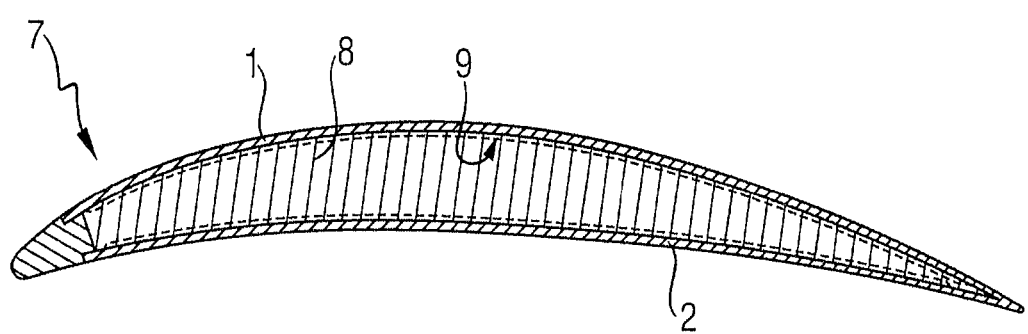

FIG. 3 shows a sectional view of a fan blade 7 having a supporting structure 8. The latter can be cell-type or honeycomb-type. By use of an intermediate layer 9, an upper workpiece 1 and a lower workpiece 2 are adhesively bonded for cladding purposes. The workpieces 1, 2 are made by the method described in the present invention and, on their side facing the intermediate layer or the supporting structure 8, respectively, feature a defined surface structure produced by the embossing element 6.

LIST OF REFERENCE NUMERALS 1, 2 Workpiece
3 Forming tool cavity
4 Top tool
5 Bottom tool
6 Embossing element
7 Blade
8 Supporting structure
9 Intermediate layer

What is claimed is:

1. A method for manufacturing a workpiece, comprising:
providing a forming tool having a first tool portion and a second tool portion, the first tool portion including a rigid first forming surface having a three dimensional shape over a majority of the first forming surface, the first forming surface also including a cavity, the second tool portion having a rigid second forming surface having a three dimensional shape over a majority of the second forming surface corresponding to the a three dimensional shape of the first forming surface;
providing a workpiece between the first forming surface and the second forming surface;
providing a separate embossing element between the workpiece and at least one chosen from the first forming surface and the second forming surface, the embossing element including a surface profile on at least one surface for producing an embossed surface structure;
forming the workpiece to a shape corresponding to the three dimensional shapes of the first forming surface and the second forming surface;
embossing the surface profile of the embossing element onto a surface of the workpiece during forming of the workpiece;
providing the surface profile in a wire mesh form;
providing the wire mesh form with at least one of a wire thickness between 0.1 and 1.0 mm and a mesh width ranging from 0.1 to 3 mm;
providing that the workpiece is a part of a hybrid component composed of a plurality of elements including the workpiece and a supporting structure;
bonding the workpiece to the supporting structure by applying an adhesive between the embossed surface of the workpiece and the supporting structure and ensuring that the adhesive anchors to the embossed surface of the workpiece.

2. The method of claim 1, and further comprising connecting the embossing element to one of the first tool portion or the second tool portion.

3. The method of claim 1, and further comprising loosely inserting the embossing element between the workece and one of the first tool portion or the second tool portion.

4. The method of claim 3, and further comprising providing that the embossing element is made of a high temperature resistant material.

5. The method of claim 4, and further comprising providing that the embossing element is made of high temperature resistant nickel base material.

6. The method of claim 5, and further comprising providing that the workpiece is part of a blade of a turbine.

7. The method of claim 6, and further comprising providing that the workpiece is part of a hybrid component composed of several elements.

8. The method of claim 2, and further comprising providing that the embossing element is made of a high temperature resistant material.

9. The method of claim 8, and further comprising providing that the embossing element is made of high temperature resistant nickel base material.

10. The method of claim 1, and further comprising providing that the workpiece is part of a blade of a turbine.

11. The method of claim 10, and further comprising providing that the workpiece is part of a hybrid component composed of several elements.

12. The method of claim 1, and further comprising providing that the embossing element is made of a high temperature resistant material.

13. The method of claim 12, and further comprising providing that the embossing element is made of high temperature resistant nickel base material.

* * * * *